（12）United States Patent
Kim et al.

(10) Patent No.: US 8,113,705 B2
(45) Date of Patent: Feb. 14, 2012

(54) OPTICAL PLATE, BACKLIGHT ASSEMBLY AND DISPLAY DEVICE INCLUDING THE SAME

(75) Inventors: Heu-Gon Kim, Yongin-si (KR);
Taek-Sun Shin, Cheonan-si (KR);
In-Sun Hwang, Suwon-si (KR);
Byung-Seo Yoon, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 795 days.

(21) Appl. No.: 12/182,684

(22) Filed: Jul. 30, 2008

(65) Prior Publication Data

US 2009/0167641 A1    Jul. 2, 2009

(30) Foreign Application Priority Data

Dec. 31, 2007  (KR) .................. 10-2007-0141683

(51) Int. Cl.
*F21V 7/04*  (2006.01)

(52) U.S. Cl. ...... 362/620; 362/97.1; 362/97.2; 362/330; 362/339; 362/606; 349/64; 349/65

(58) Field of Classification Search .................. 349/64, 349/65; 362/97.1, 97.2, 330, 339, 606, 620
See application file for complete search history.

(56) References Cited

U.S. PATENT DOCUMENTS

| 5,919,551 | A  | * | 7/1999 | Cobb et al. ..................... 362/339 |
| 7,361,409 | B2 | * | 4/2008 | Sugimoto et al. ............. 428/500 |
| 2006/0187366 | A1 | | 8/2006 | Sugimoto et al. |
| 2007/0058104 | A1 | | 3/2007 | Chen et al. |

FOREIGN PATENT DOCUMENTS

| EP | 1 550 886 | 7/2005 |
| JP | 06-082635 | 3/1994 |
| JP | 2001-083507 | 3/2001 |
| JP | 2004-031031 | 1/2004 |

OTHER PUBLICATIONS

English Abstract for Publication No. 06-082635.
English Abstract for Publication No. 2001-083507.
English Abstract for Publication No. 2004-031031.
European Search Report.

* cited by examiner

*Primary Examiner* — Stephen F Husar
(74) *Attorney, Agent, or Firm* — F. Chau & Associates, LLC

(57) ABSTRACT

Provided is an optical plate that resolves white screen generation while maintaining emission brightness, a backlight assembly and a display device including the same. The optical plate is a light guide plate for a liquid crystal display. The light guide plate includes at least one plane in which a plurality of uneven patterns forming crests and valleys are formed. The plurality of uneven patterns is formed such that the crests rise to a plurality of different heights.

20 Claims, 14 Drawing Sheets

Related art example

Embodiment

OPTICAL PLATE, BACKLIGHT ASSEMBLY AND DISPLAY DEVICE INCLUDING THE SAME

CROSS-REFERENCE TO RELATED APPLICATION

This application claims priority to Korean Patent Application No. 10-2007-0141683 filed on Dec. 31, 2007, the contents of which are incorporated by reference in their entirety.

BACKGROUND OF THE INVENTION

1. Technical Field

The present disclosure relates to a backlight assembly, and more particularly, to an optical plate, a backlight assembly and a display device including the same.

2. Discussion of the Related Art

Generally, a liquid crystal display apparatus (LCD) is a display device displaying an image using liquid crystals having optical and electrical characteristics of anisotropy in a refractive index, and anisotropy in a dielectric constant. The LCD is slim and lightweight and has a low driving voltage and low power consumption compared to other display devices such as cathode ray tubes (CRTs) and plasma display panels (PDP). Accordingly, the LCD is widely used as a display device in a variety of products.

The LCD includes a liquid crystal (LC) display panel including a thin film transistor (TFT) substrate, a color filter substrate facing the TFT substrate, and an LC layer interposed between the two substrates to change light transmittance. Also, since the LCD is not a self-luminous device in which an LC display panel displaying an image can emit light spontaneously, the LCD uses a backlight assembly supplying light onto the LC display panel.

A related art backlight assembly includes a lamp generating light, and a light guide plate (LGP) guiding light incident from the lamp disposed at a lateral side to an LC display panel. The LGP is categorized as either a flat type LGP or a wedge type LGP. In the flat type LGP, an incident portion into which light is incident and a counterpart portion which is opposite to the incident portion have the same thickness. In the wedge type LGP, the thickness of the LGP reduces toward the counterpart portion.

Recently, to prevent discoloration of the LGP and to improve brightness of the LGP, a prism LGP where a prism pattern is formed in the surface of the LGP has been developed. In case of a flat type LGP having the same thickness, light guided inside the LGP satisfies a total internal reflection condition, so that the light is emitted to the outside by the prism pattern.

However, in the case of the LGP where the prism pattern is formed, when external physical pressure is applied to a final product using the LGP, the LGP may be forced into contact with other optical members used by the LCD. For example, the LGP may be forced into contact with a prism sheet used to change a light path. Such contact may result in a white screen phenomenon whereby the light path in a medium, for example, air between the LGP and the prism sheet is obstructed due to contact of the LGP and the prism sheet, and light is not refracted but emitted at a low angle, and directly viewed.

In a related art, to resolve this white screen phenomenon, beads are coated and pressure is applied on the surface of the prism sheet facing the LGP to minimize a contact area with the LGP. However, use of the beads may contribute to a haze phenomenon, and brightness of the display may be reduced.

SUMMARY OF THE INVENTION

Embodiments of the present invention provide a light guide plate that maintains brightness and resolves a white screen phenomenon generated by pressurization, a backlight assembly having the light guide plate, and a display device having the backlight assembly that increases display quality and reliability.

In accordance with an exemplary embodiment, an optical member includes a first optical element having a plane, and a second optical element adjacent to the first optical element, having a correspondence plane corresponding to the plane of the first optical element. An uneven portion facing the plane of the first optical element is formed in the correspondence plane of the second optical element. The uneven portion has a rise/fall period.

The rise/fall period of the uneven portion may be formed in a vertical direction or a horizontal direction on the correspondence plane of the second optical element. The rise/fall period of the uneven portion may be regular or irregular.

A difference in the rise/fall period of the uneven portion may be in a range of approximately 0.1 μm to approximately 100 μm. A period interval of the uneven portion may be in a range of approximately 100 μm to approximately 10,000 μm. The uneven portion of the first optical element and a horizontal plane may form different angles.

An interval between convex portions or concave portions of the uneven portion may be in a range of approximately 10 μm to approximately 1,000 μm, and a height of the uneven portion may be in a range of approximately 1 μm to approximately 100 μm.

The first optical element may be a light guide plate. The second optical element may be an optical sheet including a reflection sheet or a prism sheet. Also, the first optical element may be an optical sheet including a reflection sheet or a prism sheet, and the second optical element may be a light guide plate.

An uneven portion facing the correspondence plane of the second optical element may be formed in the plane of the first optical element. The uneven portion of the first optical element has a rise/fall period, and a rise/fall period of the uneven portion of the first optical element may correspond to that of the uneven portion of the second optical element.

In accordance with an exemplary embodiment, an optical member includes a first medium having a plane, a second medium separated from the first medium and having a correspondence plane corresponding to the plane of the first medium, and a third medium between the first medium and the second medium. A buffer portion is formed on the correspondence plane of the second medium in a plane direction of the first medium to minimize mutual contact between the first medium and the second medium by external pressurization and secure a construction of the third medium.

The third medium may have smaller density than those of the first medium and the second medium. An uneven portion having a rise/fall period in the plane direction of the second medium may be formed in the third medium.

Also, the buffer portion of the second medium may include a group of uneven portions formed to have a height different from a height of other group of uneven portions.

The third medium may be air.

In accordance with an exemplary embodiment, a backlight assembly includes a light source unit configured to generate light, and an optical member configured to emit light incident from the light source unit. The optical member includes a first optical element having a plane, and a second optical element adjacent to the first optical element, having a correspondence plane corresponding to the plane of the first optical element. An uneven portion facing the plane of the first optical element is formed in the correspondence plane of the second optical element. The uneven portion has a rise/fall period.

The light is incident to the first optical element and is emitted to the second optical element. Alternatively, the light is incident to the second optical element and is emitted to the first optical element.

In accordance with an exemplary embodiment, a backlight assembly includes a light source unit configured to generate light and an optical member configured to emit light incident from the light source unit. The optical member includes a first medium having a plane, a second medium separated from the first medium and having a correspondence plane corresponding to the plane of the first medium, and a third medium between the first medium and the second medium. A buffer portion is formed on the correspondence plane of the second medium in a plane direction of the first medium to minimize mutual contact between the first medium and the second medium by external pressurization and secure a construction of the third medium.

The light may be incident to the first medium and emitted to the second medium by way of the third medium, or may be incident to the second medium and emitted to the first medium by way of the third medium.

In accordance with an exemplary embodiment, a liquid crystal display device includes a liquid crystal display panel including a plurality of pixels, and a backlight assembly including a light source unit and an optical member emitting light incident from the light source unit. The optical member includes a first optical element having a plane, and a second optical element adjacent to the first optical element, having a correspondence plane corresponding to the plane of the first optical element. An uneven portion facing the plane of the first optical element is formed in the correspondence plane of the second optical element, and the uneven portion having a rise/fall period.

In accordance with an exemplary embodiment, a liquid crystal display device includes a liquid crystal display panel including a plurality of pixels, and a backlight assembly including a light source unit and an optical member emitting light incident from the light source unit. The optical member includes a first medium having a plane, a second medium separated from the first medium and having a correspondence plane corresponding to the plane of the first medium, and a third medium between the first medium and the second medium. A buffer portion is formed on the correspondence plane of the second medium in a plane direction of the first medium to minimize mutual contact between the first medium and the second medium by external pressurization and secure a construction of the third medium.

BRIEF DESCRIPTION OF THE DRAWINGS

Exemplary embodiments can be understood in more detail from the following description taken in conjunction with the accompanying drawings, in which.

DETAILED DESCRIPTION OF EXEMPLARY EMBODIMENTS

Figure 1A:
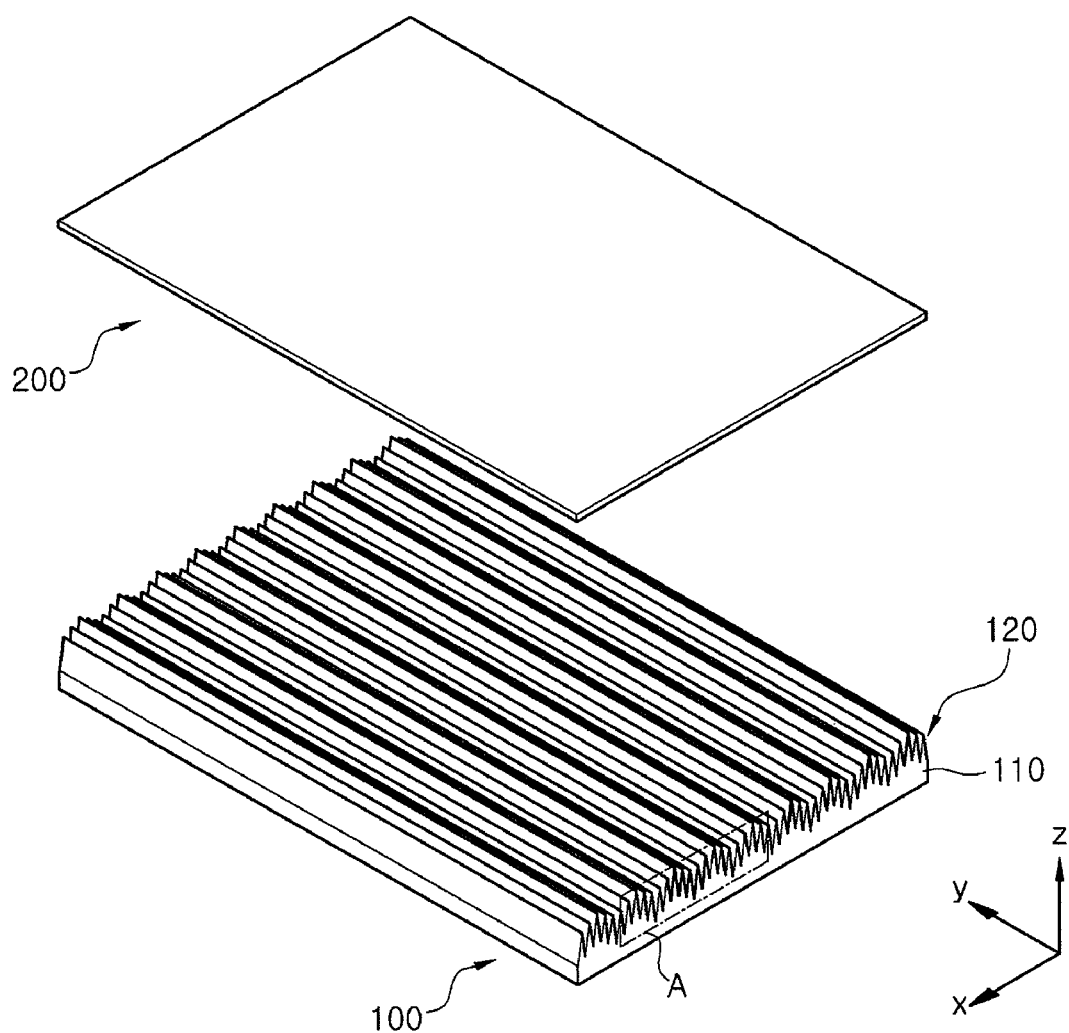
FIG. 1A is a perspective view of an optical member according to an exemplary embodiment of the present disclosure.

Hereinafter, exemplary embodiments will be described in detail with reference to the accompanying drawings.

The invention may, however, be embodied in many different forms and should not be construed as being limited to the embodiments set forth herein. Like reference numerals in the drawings may denote like elements.

Figure 1B:
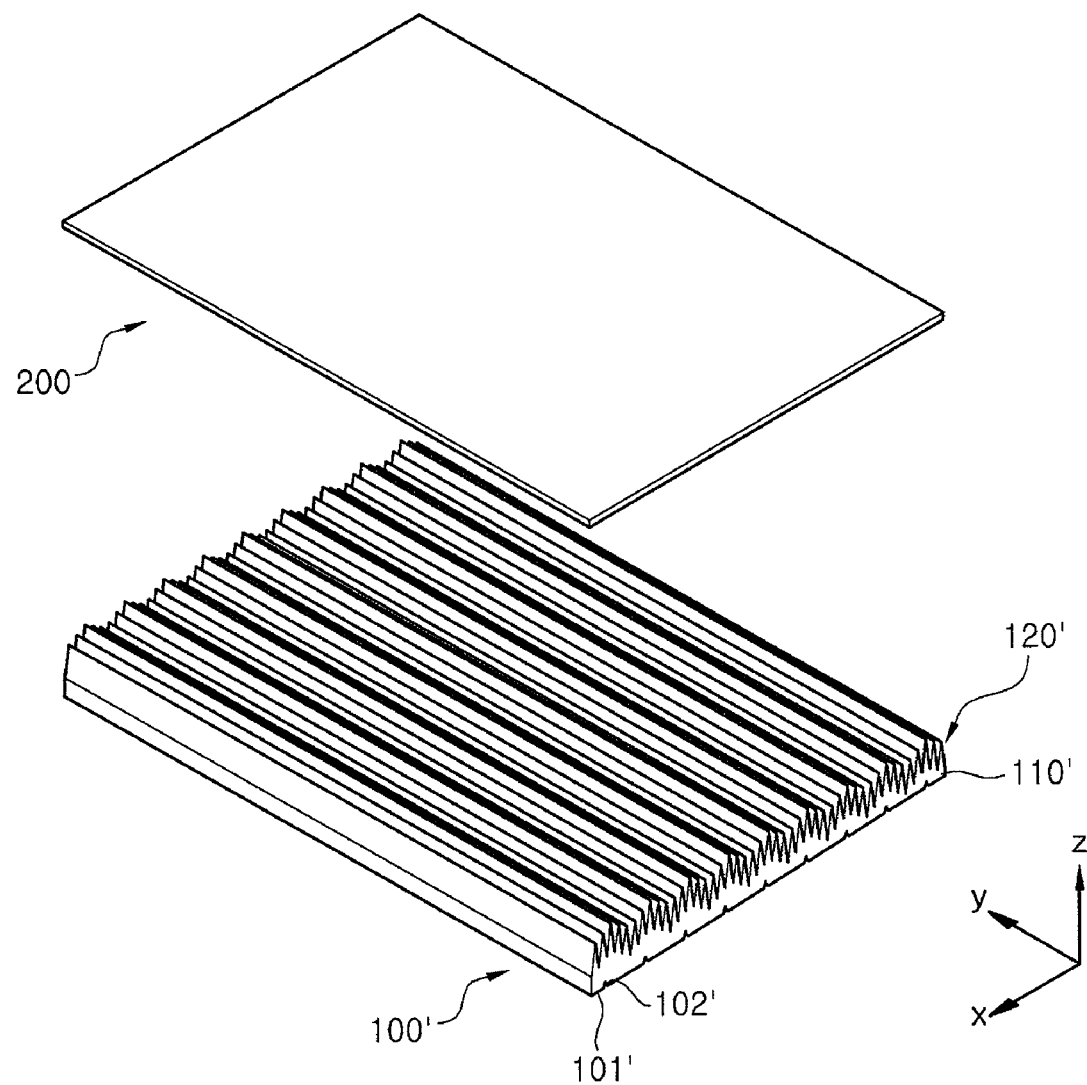
FIG. 1B is a view of a modification of FIG. 1A.
Figure 2A:
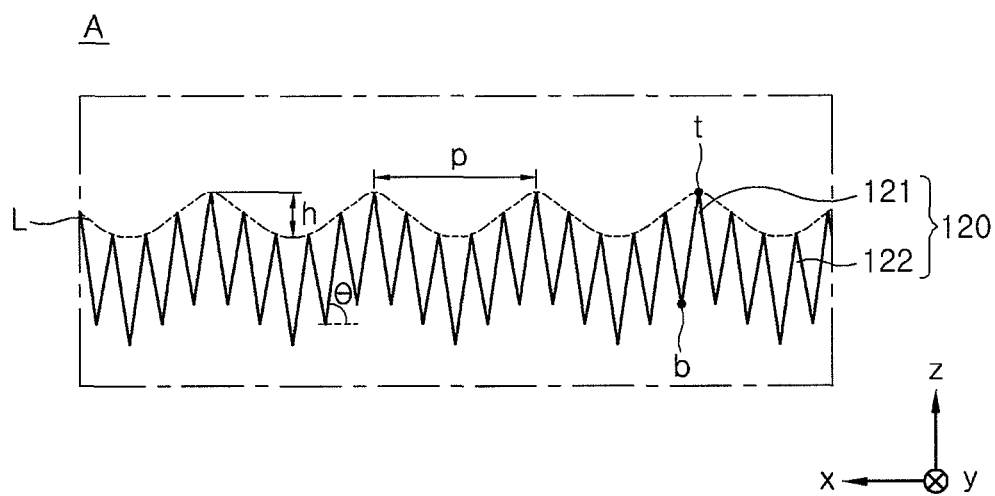
FIG. 2A is an enlarged view illustrating a portion "A" of FIG. 1A.
Figure 2B:
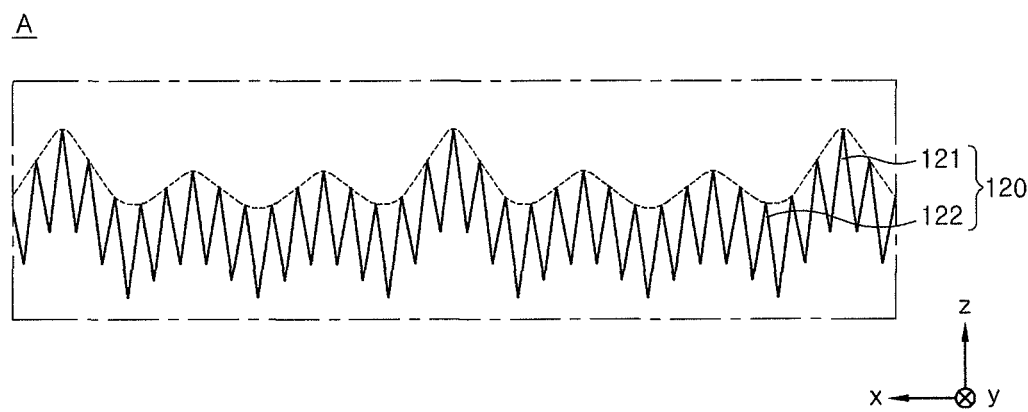
FIGS. 2B and 2C are views illustrating modifications of FIG. 2A.
Figure 2C:
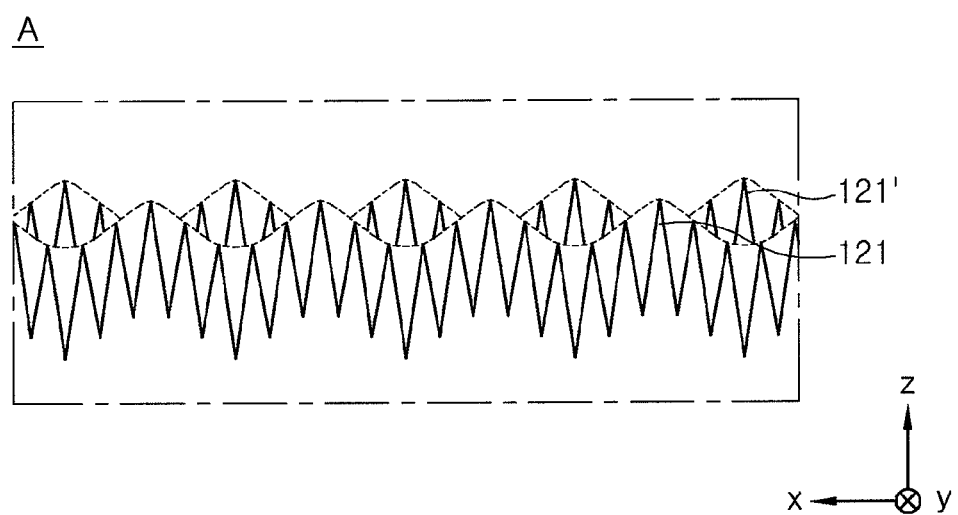

FIG. 1A is a perspective view of an optical member according to an exemplary embodiment of the present disclosure. FIG. 1B is a view of a modification of FIG. 1A. FIG. 2A is an enlarged view illustrating a portion "A" of FIG. 1A. FIGS. 2B and 2C are views illustrating modifications of FIG. 2A.

Each drawing explained below including FIG. 1 is a schematic view and the size and shape of each part may be exaggerated for easy understanding.

Referring to FIG. 1A, the optical member includes a first optical element 200 having a plane, and a second optical element 100 separated from the first optical element 200 and having a correspondence plane corresponding to the plane of the first optical element, and an uneven portion 120 facing the plane of the first optical element 200. Crests and valleys are formed in the correspondence plane of the second optical element 200. The uneven portion 120 is formed such that an extension line connecting the crests rises and falls.

The first optical element 200 is approximately plate shaped and can have an x-y plane facing a ±z-direction. Here, the first optical element 200 can be an optical sheet including a prism sheet or a reflective sheet. The prism sheet as an example of the optical element 200 can be formed of a material having excellent light transmittance such as polymethyl methacrylate (PMMA resin) and poly carbonate (PC resin) to correct inclined orientation of light emitted from a light guide plate 100, which will be described below. The primary progression direction of emitted light can be corrected to an approximate front direction, for example, a +z-direction of an emission plane. Also, a predetermined prism pattern can be formed in the plane of the prism sheet 200 in a light emission direction, for example, the +z-direction.

The second optical element 100 is approximately plate shaped and is disposed in a −z-direction with respect to the first optical element 200, and has a correspondence plane formed in the +z-direction and corresponding to the plane of the first optical element 200 in the −z direction. An uneven portion 120 is formed in the correspondence plane in the +z direction.

Here, the second optical element 100 can be a light guide plate guiding light. The light guide plate 100 shown in the drawing can have a flat rectangular parallelepiped shape. Also, the light guide plate 100 can be formed of an injection-molded material of a transparent resin such as a PMMA resin, a PC resin, and/or a cycloolefin-based resin.

The uneven portion 120 of the light guide plate 100 can be formed in a base layer 110 to face the first optical element, which may be the prism sheet 200. The uneven portion 120 can include a plurality of patterns forming crests and valleys with a rise/fall period. Referring to FIG. 2A, the uneven portion 120 is formed in a plurality of crests, for example, a pattern including a combination of a crest t and a valley b. The combination of the crest t and the valley b forms a rise/fall period where an extension line connecting the crests t rises and falls. Also, the plurality of crests t and valleys b can be formed as a line in a +y-direction. The plurality of valleys b can have different heights from the lower surface of the light guide plate 100 to the +z-direction, and can be designed to be equal to one another. Also, the crest t and the valley b of each pattern of the uneven portion 120 can have different shapes. For example, the crest t and the valley b can be formed to be sharp or curved. Accordingly, the shape of each pattern can be varied.

In a modified example illustrated in FIG. 1B, a shape having a predetermined pattern 102' is formed in a lower surface 101' of a light guide plate 100' where an uneven portion 120' is formed in a base layer 110'. The pattern 102' can be formed in the lower surface 101' of the light guide plate 100' using an intaglio of the +z-direction. The patterns 102' can be transferred to the lower surface 101' using an injection molding method. The patterns 102' can be formed in the lower surface 101' using various methods such as a stamping method. The pattern 102' formed in the lower surface 101' is designed for increasing reflectivity of light to the +z-direction when the light is incident into the light guide plate 100' in an −x-direction. The pattern 102' can have a predetermined inclination angle to be approximately perpendicular to the −x-direction in which the light is incident. Also, the lower surface 101' can be formed in the same direction in which light is incident, for example, such that the lower surface 101' approaches the +z-direction as it goes in the +x-direction. Consequently, the base layer 110' has a wedge shape getting thick toward the +x-direction and getting thin toward the −x-direction. In the case where the base layer 110' has the wedge shape, a light source, which will be described later, can be disposed in the +x-direction of the light guide plate 100'. The shapes of the lower surface 101' and the pattern 102' can change depending on details of a required light guide plate 100'.

Referring to FIG. 2A, a virtual line L connecting the crests t of the uneven portion 120 has an approximate waveform. The waveform virtual line L may have a particular period. The plurality of crests t may have different heights, respectively. The height of the crest t can repeatedly rise and fall along ±x-directions, and the rise and fall repetition of the height of the crest t can be performed periodically. An interval p between maximum points 121 of the waveform virtual line L can be regarded as one period. The interval p can be in the range of approximately 100 μm to approximately 10,000 μm. When the interval p is less than 100 μm, the uneven portion 120 may have a shape similar to a prism pattern formed in a related art light guide plate, and an area through which the light guide plate 100 contacts the prism sheet 200 during application of physical pressure from the outside may be excessively large. When the interval p exceeds 10,000 μm, the interval p is excessively large, so that there is possibility that a region between the intervals p easily contacts the prism sheet 200 during application of physical pressure from the outside. A distance between the crests t can be in the range of approximately 10 μm to approximately 1,000 μm, and a height from the valley b to the crest t can be in the range of approximately 1 μm to approximately 100 μm.

Also, a crest height difference h in the +z-direction between a maximum point 121 and a minimum point 122 may be in the range of approximately 0.1 μm to approximately 100 μm. A height difference h of less than 0.1 μm allows the uneven portion 120 to have a shape similar to the prism pattern formed in the related art light guide plate, so that an area through which the light guide plate 100 contacts the prism sheet 200 during application of physical pressure from the outside increases. A height difference h of greater than 100 μm makes forming the light guide plate 100 complicated, and a final product becomes thick due to the excessive height of the uneven portion 120. An angle θ formed by the prism pattern of the uneven portion 120 with respect to a horizontal plane can be designed with consideration of the entire shape of the uneven portion 120, and can have a value of approximately 60 to approximately 150°, but is not limited thereto. The respective patterns can have the same or different angle θ.

The uneven portion 120 may have a regular period allowing a rise and fall is repeated as in FIG. 2A, or may have an irregular period where a rise and fall is not repeated as in FIG. 2B. Also, referring to FIG. 2C, a plurality of crests t and valleys b can have a rise/fall period in the +y-direction. The rise/fall period in the +x-direction of the uneven portion 120 need not coincide with the rise/fall period in the +y-direction of the uneven portion 120. A maximum point 121 of the uneven portion 120 in one direction need not coincide with a maximum point 121' of the uneven portion 120 in the other direction. Even in this case, a rise/fall period in the +y-direction can be either regular or irregular. Also, the rise/fall period, for example, the interval p of the uneven portion 120 can change.

The uneven portion 120 formed with the rise/fall period can reduce a contact area between the light guide plate 100 and the prism sheet 200. Particularly, the uneven portion 120 can reduce the contact area when pressure is applied to the light guide plate 100 or the prism sheet 200 in the ±z-directions. Accordingly, only top portions of the virtual line L connecting the crests t of the uneven portion 120 of the light guide plate 100 formed in an approximate waveform virtual line L contact the prism sheet 200, so that the contact area can be reduced even more in comparison with the related art structure where an entire prism pattern contacts the prism sheet. The reduction in the contact area can be particularly significant when pressure is applied to the optical member. Consequently, a white screen phenomenon generated by the application of pressure to the optical member can be suppressed.

Figure 3:
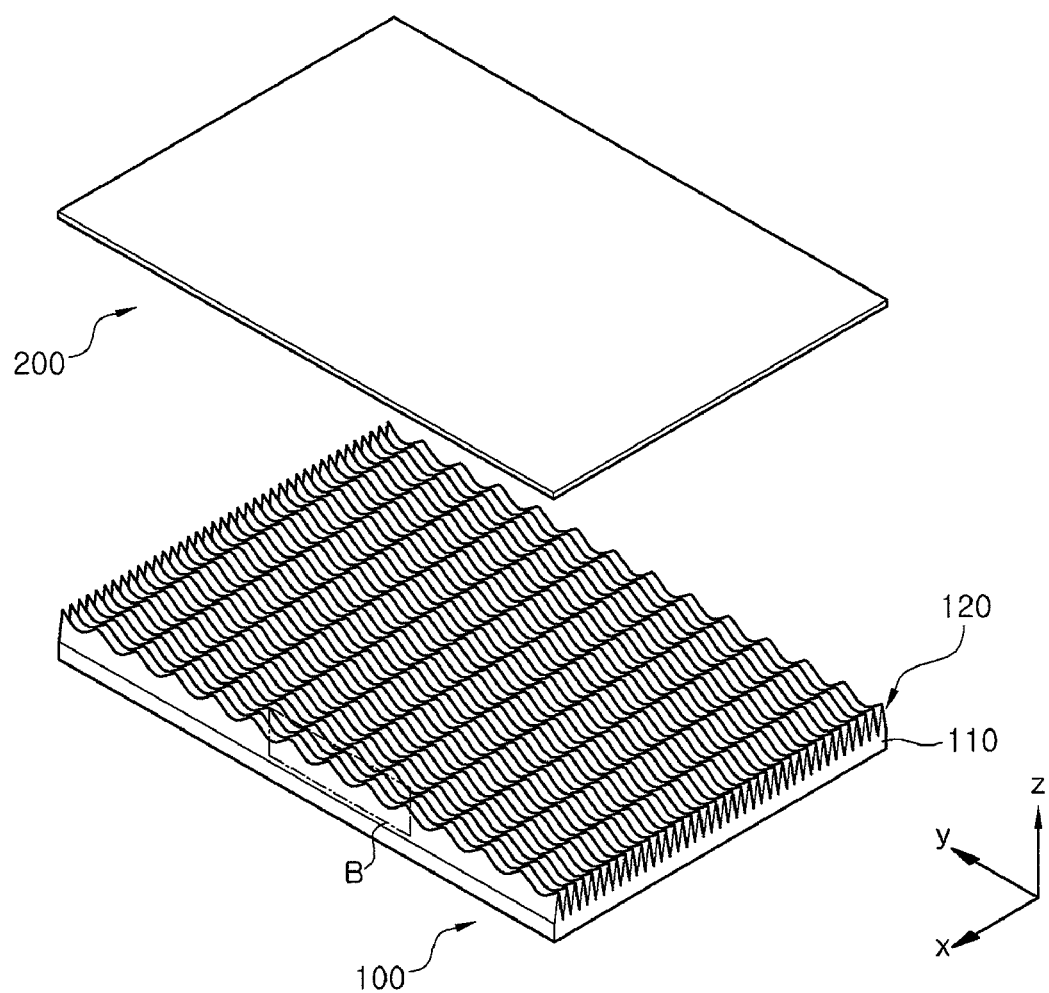
FIG. 3 is a perspective view of an optical member according to an exemplary embodiment of the present disclosure.
Figure 4A:
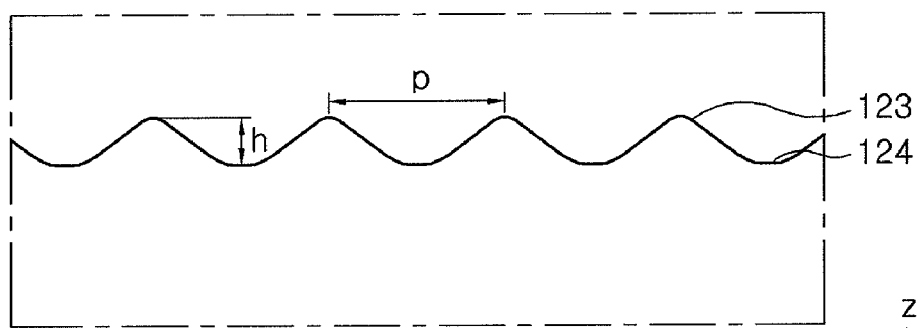
FIG. 4A is an enlarged view illustrating a portion "B" of FIG. 3.
Figure 4A:
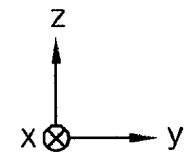

FIG. 3 is a perspective view of an optical member according to an exemplary embodiment of the present disclosure, FIG. 4A is an enlarged view illustrating the portion "B" of FIG. 3, and FIGS. 4B through 4D are views illustrating the modified examples of FIG. 4A.

Referring to FIG. 3, the optical member includes a first optical element 200 having a plane, and a second optical element 100 separated from the first optical element 200 and having a correspondence plane corresponding to the plane of the first optical element, an uneven portion 120 facing the plane of the first optical element 200 being formed in the correspondence plane of the second optical element 200. Unlike the uneven portion 120 having the rise/fall period in the +x-direction according to the exemplary embodiment described above with reference to FIG. 1, the uneven portion 120 has a rise/fall period in the +y-direction. In this embodiment, the uneven portion 120 in the +x-direction does not have a rise/fall period but is formed in a general prism shape.

Figure 4B:
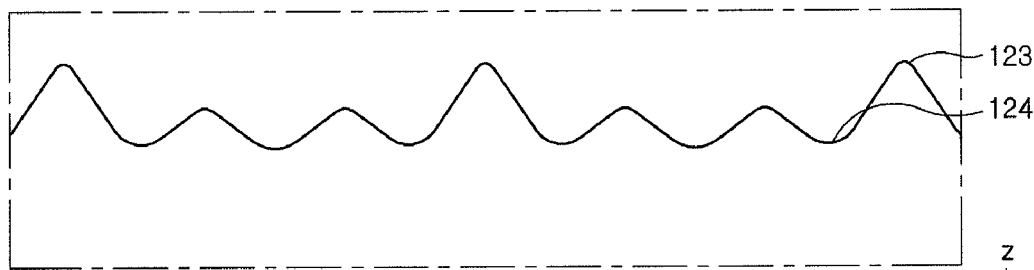
FIGS. 4B through 4D are views illustrating modified examples of FIG. 4A.
Figure 4B:
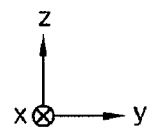
Figure 4C:
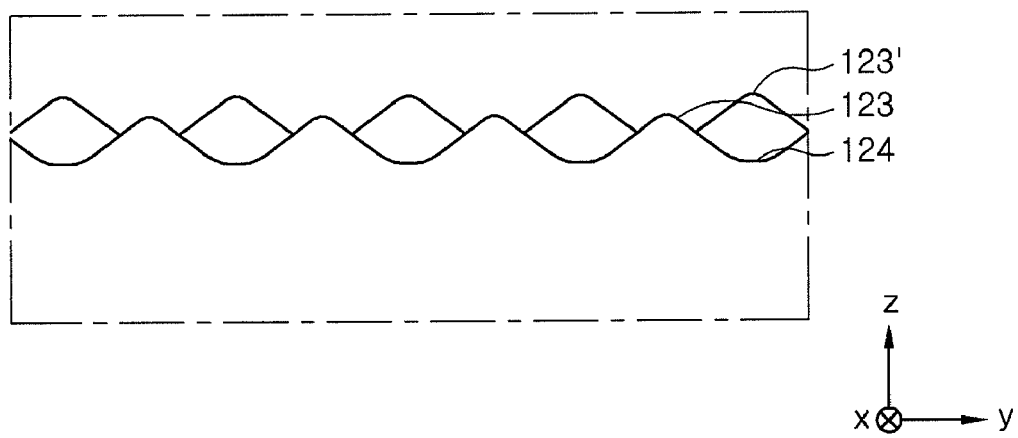

According to an exemplary embodiment, a maximum point 123 and a minimum point 124 of the uneven portion 120 can also be repeated regularly (FIG. 4A) or irregularly (FIG. 4B). Also, the rise/fall period of the uneven portion 120 in the +y-direction need not coincide with that in the +x-direction. Referring to FIG. 4C, the maximum point 123 of the uneven portion 120 in one direction need not coincide with the maximum point 123' in the other direction.

Figure 4D:
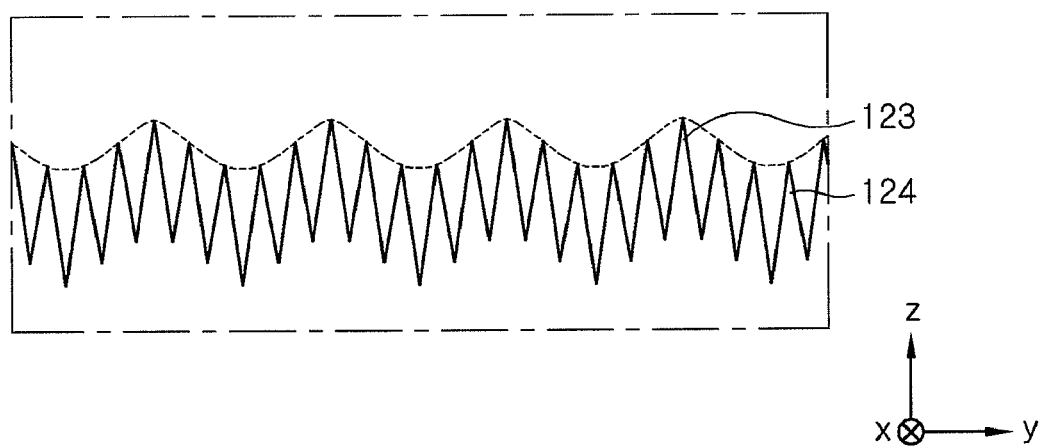

Moreover, the uneven portion 120 can have a simple rise/fall period as illustrated in FIGS. 4A to 4C, and can have a rise/fall period formed in a prism pattern as illustrated in FIG. 4D. Reference numerals 123 and 124 in FIG. 4D denote a maximum point and a minimum point, respectively.

Figure 5:
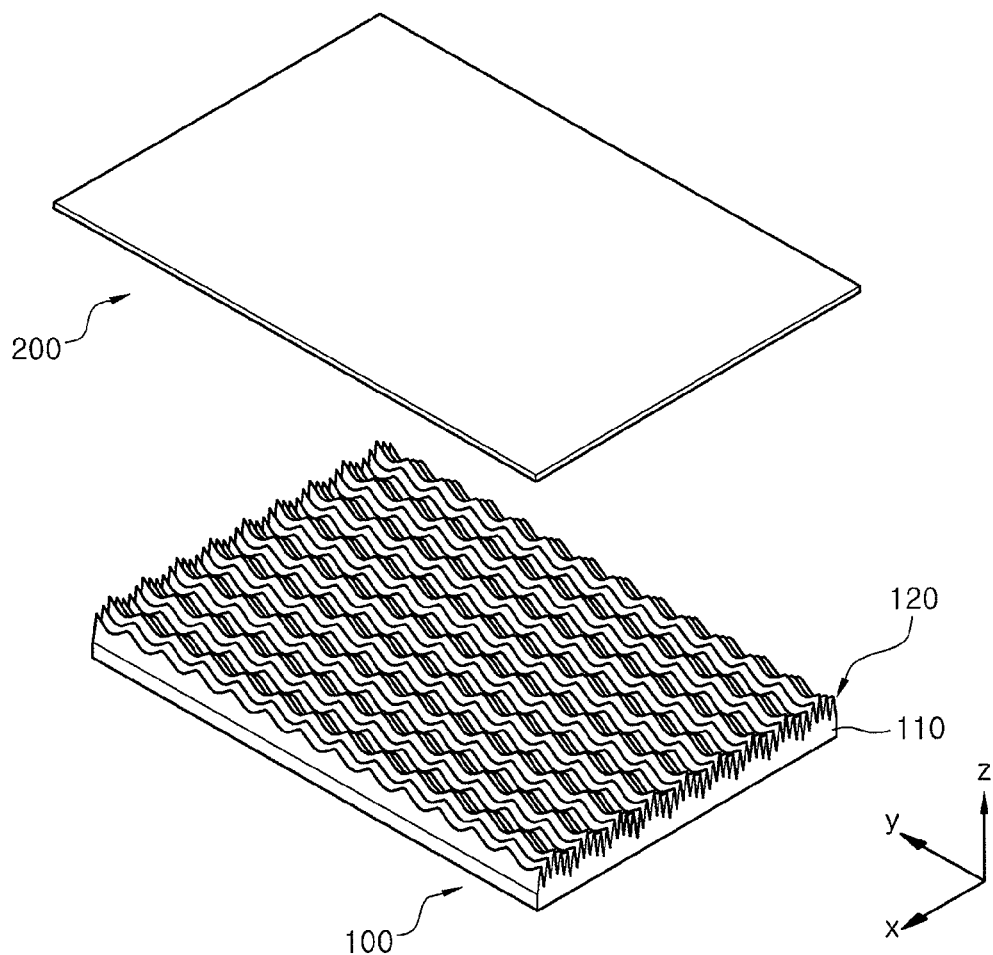
FIGS. 5 through 7 are perspective views of optical members according to exemplary embodiments.

FIG. 5 is a perspective view of an optical member according to an exemplary embodiment.

Referring to FIG. 5, the optical member includes a first optical element 200 having a plane, and a second optical element 100 separated from the first optical element 200 and having a correspondence plane corresponding to the plane of the first optical element. An uneven portion 120 facing the plane of the first optical element 200 is formed in the correspondence plane of the second optical element 200. The rise/fall periods of the uneven portion 120 are formed in the +x-direction and the +y-direction, respectively.

The rise/fall period of the uneven portion 120 in the +x-direction can be applied as described above, and the rise/fall period of the uneven portion 120 can also be applied as described above.

Figure 6:
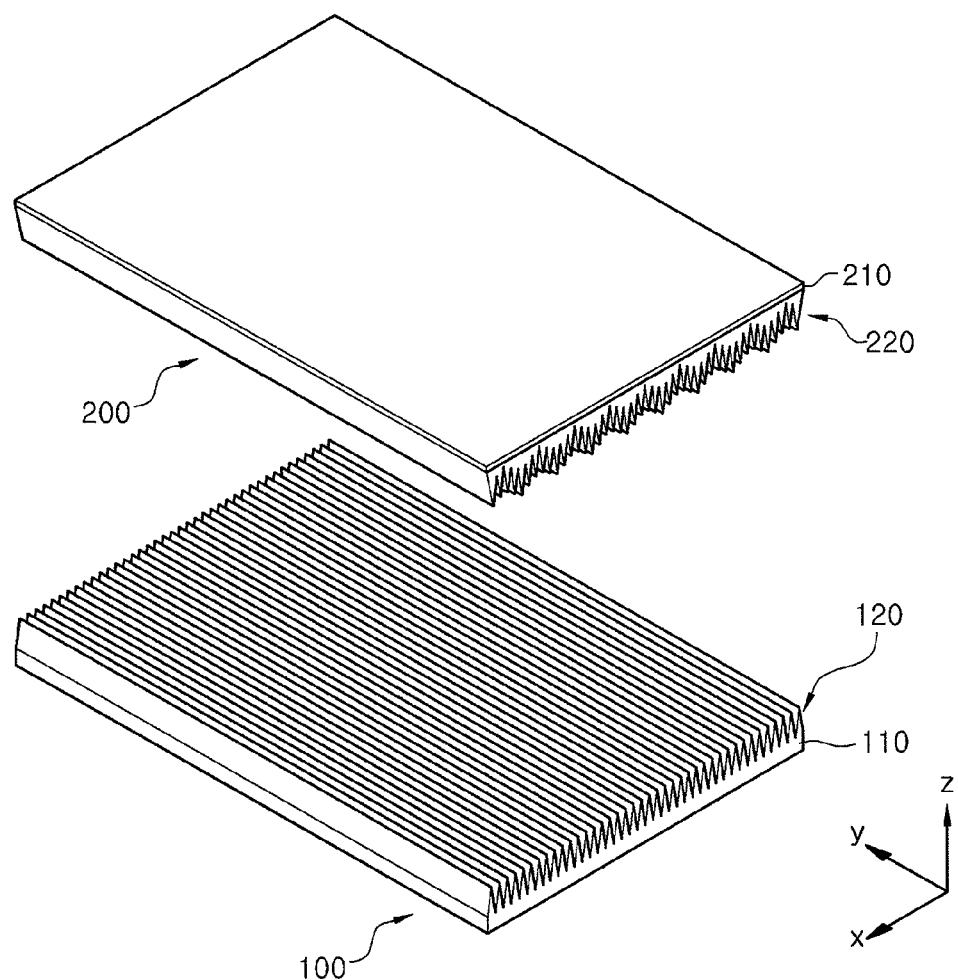
Figure 7:
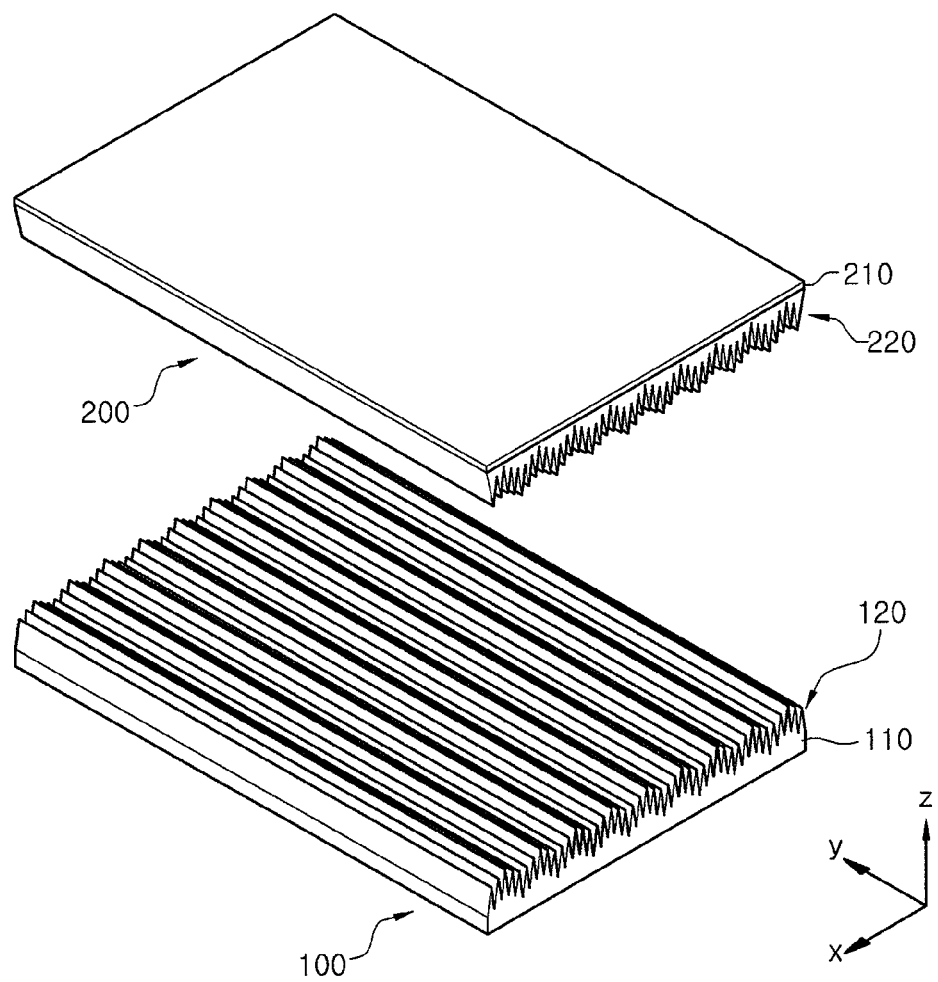

FIG. 6 is a perspective view of an optical member according to an exemplary embodiment, and FIG. 7 is a perspective view of an optical member according to an exemplary embodiment.

Referring to FIG. 6, the optical member includes a second optical element 100 having a plane, and a first optical element 200 separated from the second optical element 100 and having a correspondence plane corresponding to the plane of the second optical element 100. An uneven portion 220 facing the plane of the second optical element 100 is formed in a base layer 210 of the correspondence plane of the first optical element 200. The uneven portion 220 has a rise/fall period. The second optical element 100 can be a light guide plate, and the first optical element 200 can be an optical sheet including a prism sheet.

Referring to FIG. 7, the optical member includes a second optical element 100 having a plane, and a first optical element 200 separated from the second optical element 100 and having a correspondence plane corresponding to the plane of the second optical element 100. An uneven portion 220 facing the plane of the second optical element 100 and having a rise/fall period is formed in the correspondence plane of the first optical element 200. An uneven portion 120 having a rise/fall period can also be formed in the plane of the second optical member 100 that corresponds to the uneven portion 220. The second optical member 100 can be a light guide plate, and the first optical element 200 can be an optical sheet including a prism sheet. The second optical element 100 can be an optical sheet including a prism sheet, and the first optical element 200 can be a light guide plate. Moreover, the rise/fall period of the uneven portion 120 of the second optical element 100 can coincide with that of the uneven portion 220 of the first optical element 200.

The uneven portion 120 of the second optical element 100 or the uneven portion 220 of the first optical element 200 can be regular or irregular as discussed above.

Figure 8:
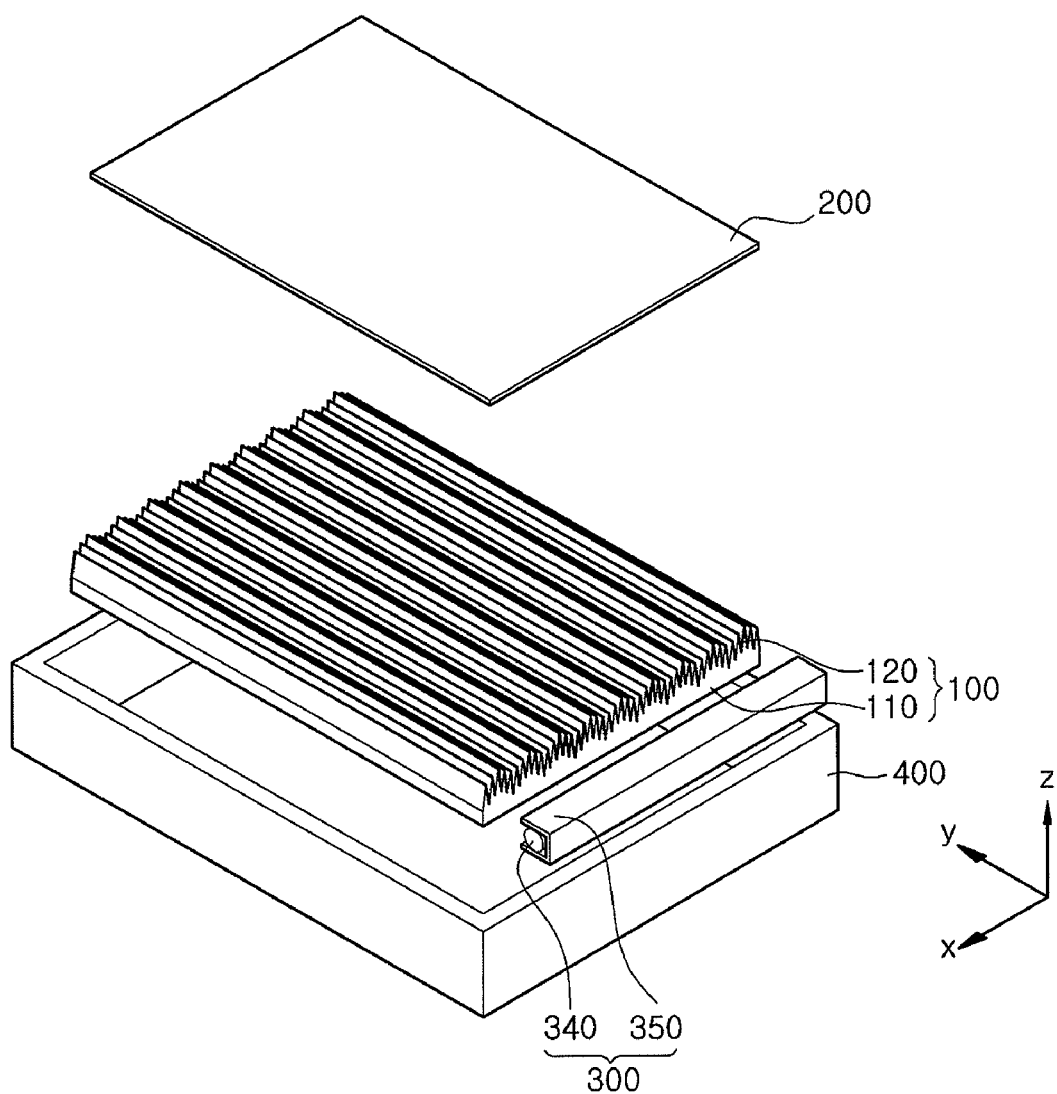
FIG. 8 is a schematic perspective view of a backlight assembly according to an exemplary embodiment of the present disclosure.

FIG. 8 is a schematic view of a backlight assembly according to an exemplary embodiment of the present disclosure.

Referring to FIG. 8, the backlight assembly includes a light source unit 300, a light guide plate 100 on the light source unit 300, and a receiving member 400 receiving the light source unit 300 and the light guide plate 100. An optical sheet 200 including a prism sheet is provided on the light guide plate 100.

The light source unit 300 includes a lamp 340 provided on one side of the light guide plate 100, and a cover unit 350 guiding light of the lamp 340 to the light guide plate 100. The light guide plate 100 changes light of the lamp 340 having a linear light distribution to a planar light distribution.

The lamp 340 may be a cold cathode fluorescent lamp (CCFL). However, the embodiment is not limited thereto. All kinds of lamps emitting light in an infrared wavelength band and/or a visible light (for example, white light) can be used as the lamp. Though not shown, the CCFL includes a glass tube filled with a mixture of Hg, Ne, and Ag, a cathode and an anode provided on both sides of the glass tube, respectively, and a phosphor layer coated on the inner surface of the glass tube.

In the CCFL, an electron emitted under an electric field applied between the anode and the cathode generates state transition of Hg to allow light in a predetermined wavelength band to be emitted, and a phosphor body changes light in this wavelength band into visible light and emits the same. At this point, the light passes through the light guide plate 100, and is emitted to the optical sheet 200, for example, in the form of x-y plane light to the +z-direction.

The light guide plate 100 includes a base layer 110, and an uneven portion 120 on the base layer 110. Here, the structure of the optical member described above with respect to FIGS. 1 through 7 can be applied to the constructions of the light guide plate 100 and the optical sheet 200.

Hereinafter, a liquid crystal display device having a backlight assembly according to an exemplary embodiment of the present disclosure will be described.

Figure 9:
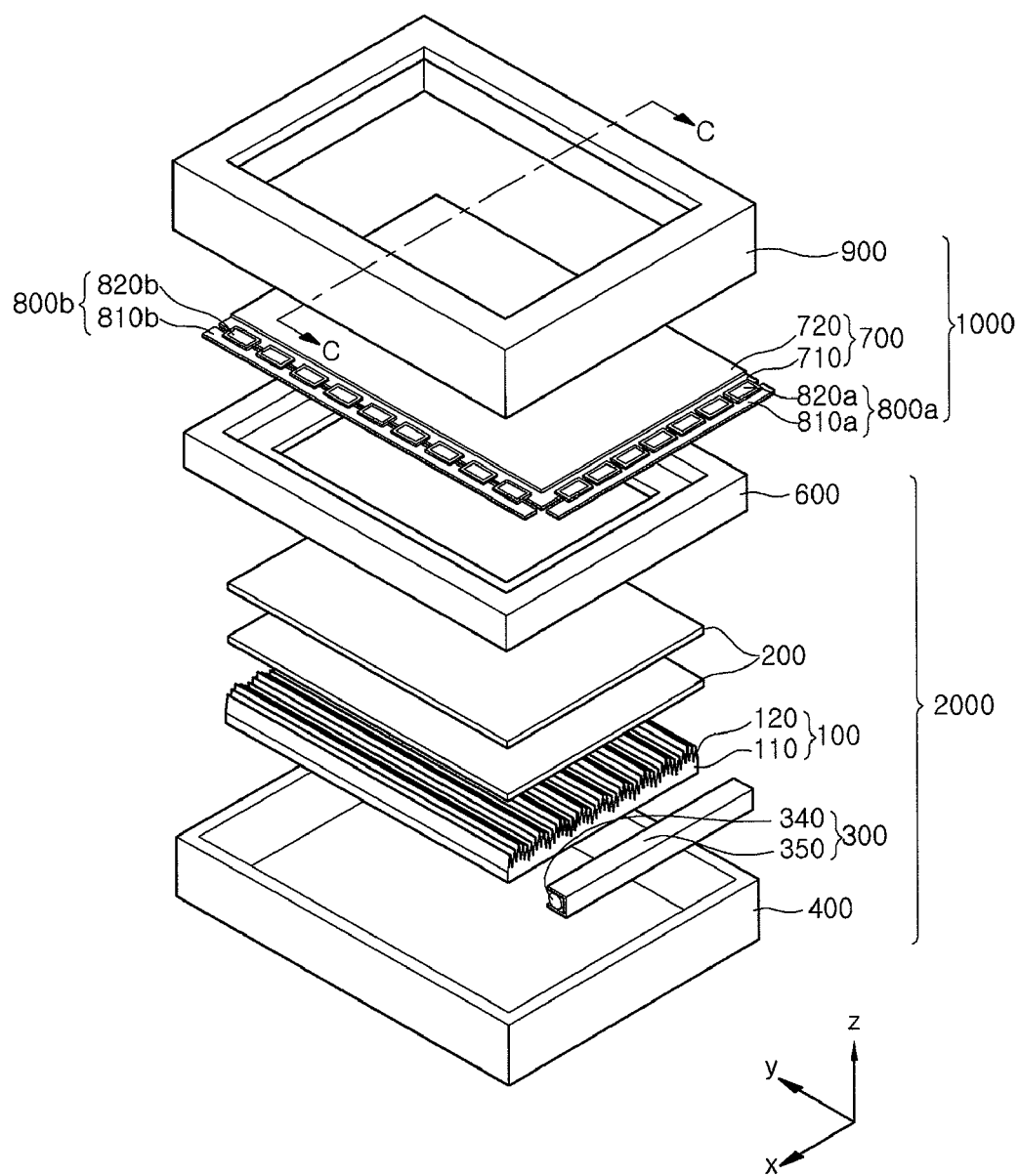
FIG. 9 is a schematic perspective view of a liquid crystal display device according to an exemplary embodiment of the present disclosure.
Figure 10:
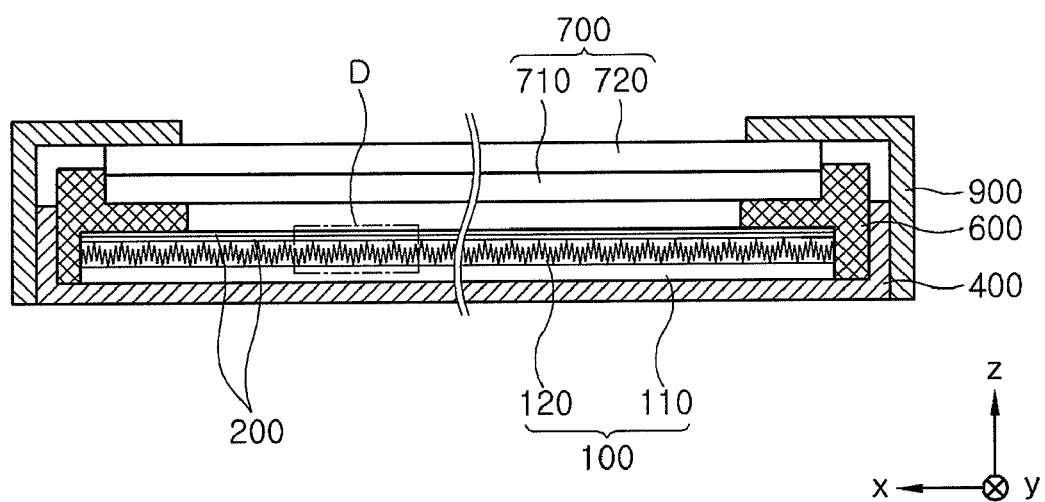
FIG. 10 is a conceptual cross-sectional view of the liquid crystal display device of FIG. 9, taken along a line C-C.

FIG. 9 is a schematic perspective view of a liquid crystal display device according to an exemplary embodiment of the present disclosure, and FIG. 10 is a conceptual cross-sectional view of the liquid crystal display device of FIG. 9, taken along a line C-C.

Referring to FIGS. 9 and 10, the liquid crystal display device includes a display assembly 1000 disposed in the upper portion and a backlight assembly 2000 disposed in the lower portion.

The display assembly 1000 includes an LC display panel 700, a driving circuit unit 800 (800a and 800b), and an upper receiving member 900.

The LC display panel 700 includes a color filter substrate 720 and a thin film transistor (TFT) substrate 710. The driving circuit unit 800 includes a gate side printed circuit board (PCB) 810a and a data side PCB 810b. The gate side printed circuit board 810a is connected to gate lines of the TFT substrate 710 through a gate side flexible printed circuit board (FPCB) 820a. The data side PCB 810b is connected to the data lines of the TFT substrate 710 through a data side FPCB 820b. The gate side PCB 810a can be omitted if necessary.

The upper receiving member 900 is manufactured in a quadrangular frame shape having a plane portion and a sidewall portion to prevent the elements of the display assembly 1000 from being detached, and additionally, to protect the LC display panel 700 or the backlight assembly 2000 that may be easily broken by an impact applied from the outside. The plane portion of the upper receiving member 900 supports a portion of the edge of the LC display panel 100 at its lower side, and the sidewall portion of the upper receiving member 900 faces and couples to the sidewalls of a lower receiving member 400. The upper receiving member 900 and the lower receiving member 400 may be formed of metal having excellent strength, lightweight, and small deformation characteristics.

Next, the backlight assembly 2000 includes a light source unit 300 generating light, a light guide plate 100 disposed on one side of the light source unit 300, an optical sheet 200 disposed on the light guide plate 100, a support unit 600 supporting the light guide plate 100 and the optical sheet 200, and the lower receiving member 400 receiving the light source unit 300, the light guide plate 100, and the optical sheet 200.

The light source unit 300 includes a lamp 340 provided on one side of the light guide plate 100, and a cover unit 350 guiding light of the lamp 340 to the light guide plate 100. According to the present embodiment, the lamp 340 is disposed such that the length direction, for example, the y-direction of the lamp 340 is parallel to the long axis direction, for example, the y-direction of the lower receiving member 400. The disposition of the lamp 340 is not limited thereto, but the lamp 340 can be disposed in the x-direction such that the length direction of the lamp 340 is perpendicular to the long axis direction of the lower receiving member 400. To stably support the light source unit 300, a separate fixing unit can be provided.

The light guide plate 100 provided on one side of the light source unit 300 includes a base layer 110 and an uneven portion 120 on the base layer 110. The base layer 110 allows light incident from the light source unit 300 to be directed to the front side of the LC display panel 700, diffuses light so that uniform light distribution is achieved over a wide range, and illuminates the light to the LC display panel 700. The light is emitted from the base layer 110 to the uneven portion 120 in the z-direction. Here, the light guide plate 100 and the optical sheet 200 are not limited to the above-described structures but can use the structure of the optical plate 100 according to the exemplary embodiments described above with reference to FIGS. 1 through 7. Also, the base layer 110 of the light guide plate 100 can include a concave pattern in its lower plane, for example, a plane opposite to the plane having the uneven portion 120.

The optical sheet 200 can include at least one prism sheet, at least one polarizing sheet, at least one brightness improving sheet, and at least one diffusion sheet. The polarizing sheet changes a portion of light incident thereto that is incident at a slope angle such that the portion of light incident at the slope angle is perpendicularly emitted. The brightness improving sheet transmits light having an axis parallel to its transmission axis, and reflects light having an axis perpendicular to its transmission axis. The diffusion sheet allows incident light to be diffused and emitted on a plane. These optical sheets allow light to be incident in a direction perpendicular to the LC display panel 700 to increase light efficiency. The optical sheet 200 can be provided on the light guide plate 100. Also, a single sheet can be attached on the light guide plate 100 in a light emission direction, for example, in the z-direction. Accordingly, the thicknesses of the backlight assembly 2000 and the liquid crystal display device can be reduced.

The support unit 600 is manufactured in a quadrangular frame shape, and supports the light guide plate 100 and the optical sheet 200, and also supports the LC display panel 700 at the upper portion.

The lower receiving member 400 is formed in a rectangular parallelepiped box shape whose upper surface is open, and a receiving space of a predetermined depth is formed inside the lower receiving member 400. Also, a reflector (not shown) can be provided on the bottom surface of the lower receiving member 400.

The backlight assembly 2000 of the liquid crystal display device can be the backlight assembly as described above with reference to FIG. 9.

Figure 11:
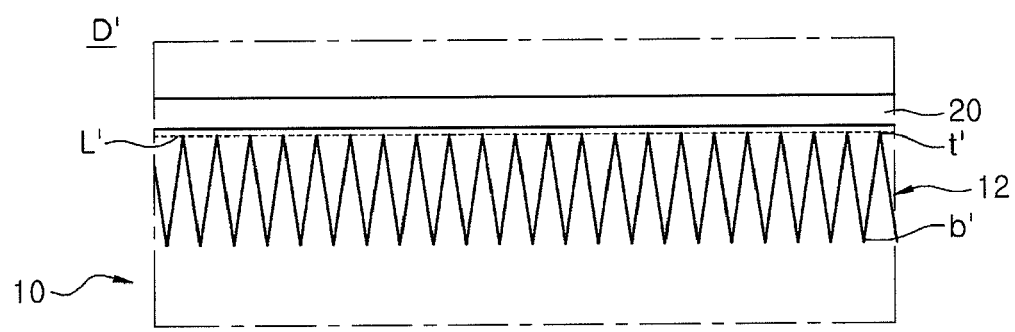
FIG. 11 is a view enlarging the portion "D" of FIG. 10 and comparing the portion "D" with a related art example.
Figure 11:
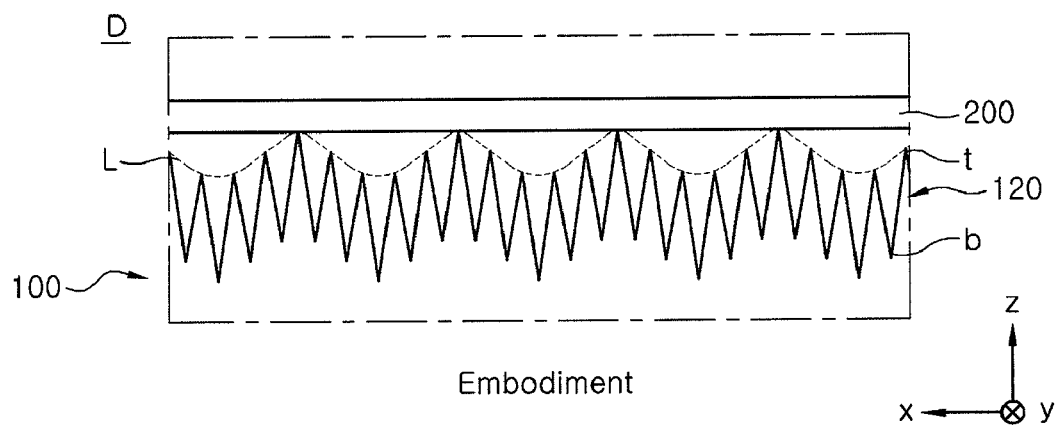

FIG. 11 is a view enlarging the portion "D" of FIG. 10 and comparing the portion "D" with a related art example.

Referring to FIG. 11, in an example of a related art, the crests and crests of the prism pattern 12 of the light guide plate 10 are in parallel to one another and located on a straight line. A virtual line connects the crests t' of the uneven portion 12 with a straight virtual line L', and the prism sheet 20 is disposed on the upper portion of the prism pattern 12. In this case, when pressure is applied in the ±z-direction, the prism pattern 12 and the lower surface of the prism sheet 20 easily contact each other. This contact changes a light path and generates a white screen phenomenon.

Accordingly, light that should pass through dense-loose-dense media of the light guide plate 10-air-the prism sheet 20 passes through dense-dense media of the light guide plate 10-the prism sheet 20, so that a degree of refraction decreases, and thus, the light is concentrated on the pressured portion and a white screen phenomenon is generated.

On the other hand, according to an exemplary embodiment of the present disclosure, only the maximum points of the waveform virtual line L contact the prism sheet 200 due to the uneven portion 120 having the rise/fall period and formed in the light guide plate 100 even when pressure is applied in the ±z-direction. Accordingly, the contact area of the prism pattern of the light guide plate 100 contacting the prism sheet 200 is reduced compared to the related art case. The uneven portion 120 of the light guide plate 100 serves as a buffer securing an interval between the light guide plate 100 and the prism sheet 200 even when physical force due to pressure to the prism sheet 200 is applied. Therefore, even when pressure is applied, a light path can be secured so that light can pass through dense-loose-dense media of the light guide plate 100, the air, and the prism sheet 200. Accordingly, even when the pressure is applied, the white screen phenomenon by which light is concentrated on the pressured portion can be reduced or eliminated.

The present disclosure can resolve a white screen phenomenon generated by pressurization during actual use while maintaining brightness.

Also, the present disclosure can provide a display device having an improved display quality and reliability.

Although the optical plate, the backlight assembly and the display device including the same have been described with reference to the specific exemplary embodiments, they are not limited thereto. Therefore, it will be readily understood by those skilled in the art that various modifications and changes can be made thereto without departing from the spirit and scope of the present invention.

An "optical sheet," as described herein can include at least one prism sheet, at least one polarizing sheet, at least one brightness improving sheet, and/or at least one diffusion sheet. The optical sheet may be a single sheet from among the above-named sheets or the optical sheet may be a group of elements formed of a combination of the sheets. Therefore, though the prism sheet has been mentioned as an example of an optical sheet through the specification, this example is offered for conveniently explaining the detailed description and the optical sheet is not limited to the prism sheet.

What is claimed is:

1. A backlight assembly for a liquid crystal display comprising:
   a light source unit configured to generate light;
   a light guide plate disposed on one side of the light source unit; and
   a prism sheet or a reflective sheet disposed in proximity to the light guide plate,
   wherein the light guide plate comprises at least one plane in which a plurality of uneven patterns forming crests and valleys are formed, the plurality of uneven patterns being formed such that the crests rise to a plurality of different heights.

2. The backlight assembly of claim 1, wherein the height of the crests follows a repeating pattern.

3. The backlight assembly of claim 1, wherein the height of the crests does not follow a repeating pattern.

4. The backlight assembly of claim 1, wherein a difference between the height of a tallest crest and the height of a shortest crest is within a range of approximately 0.1 µm to approximately 100 µm.

5. The backlight assembly of claim 2, wherein a period interval of the repeating pattern is in a range of approximately 100 µm to approximately 10,000 µm.

6. The backlight assembly of claim 1, wherein the plurality of uneven patterns form angles with respect to a horizontal plane that are constant from pattern to pattern.

7. The backlight assembly of claim 1, wherein the plurality of uneven patterns form angles with respect to a horizontal plane that are varied from pattern to pattern.

8. The backlight assembly of claim 1, wherein an interval between the crests or the valleys of the uneven pattern is in a range of approximately 10 µm to approximately 1,000 µm.

9. The backlight assembly of claim 1, wherein a height difference between the crest and the valley of the uneven pattern is in a range of approximately 1 µm to approximately 100 µm.

10. A backlight assembly comprising:
    a light source unit configured to generate light;
    a light guide plate disposed on one side of the light source unit; and
    a prism sheet or a reflective sheet disposed in proximity to the light guide plate,
    wherein the light guide plate is configured to emit light incident from the light source unit,
    wherein the light guide plate comprises a first plurality of uneven patterns forming crests and valleys being formed in at least one plane of the light guide plate, and
    wherein the first plurality of uneven patterns is formed such that the crests rise to a plurality of different heights.

11. The backlight assembly of claim 10, wherein the prism sheet or the reflective sheet is disposed on the plane of the light guide plate in which the first plurality of uneven patterns are formed.

12. The backlight assembly of claim 11, wherein an air layer is formed between the prism sheet or the reflective sheet and the light guide plate.

13. The backlight assembly of claim 10, wherein a thickness of one side of the light guide plate facing the light source unit is greater than that of a side of the light guide plate not facing the light source.

14. A backlight assembly comprising:
    a light source unit configured to generate light; and
    an optical plate disposed on one side of the light source unit and configured to emit light incident from the light source unit, a first plurality of uneven patterns forming crests and valleys being formed in at least one plane of the optical plate, and the first plurality of uneven patterns being formed such that the crests rise to a plurality of different heights,
    wherein an optical sheet is disposed on the plane of the optical plate in which the first plurality of uneven patterns are formed, and
    wherein a second plurality of uneven patterns forming crests and valleys are formed in a plane of the optical sheet facing the optical plate. facing the optical plate.

15. The backlight assembly of claim 14, wherein the second plurality of uneven patterns of the optical sheet are formed such that the crests rise to a plurality of different heights.

16. The backlight assembly of claim 15, wherein the second plurality of uneven patterns of the optical sheet corresponds to the first plurality of uneven patterns of the optical plate.

17. A backlight assembly comprising:
    a light source unit configured to generate light; and
    an optical plate disposed on one side of the light source unit and configured to emit light incident from the light source unit, a first plurality of uneven patterns forming crests and valleys being formed in a least one plane of the optical plate, and the first plurality of uneven patterns being formed such that the crests rise to a plurality of different heights,
    wherein the optical plate has a concave pattern configured to reflect light incident from the light source unit.

18. A display device comprising:
    a display panel comprising a plurality of pixels; and
    a backlight assembly comprising a light source unit providing light onto the display panel, and a light guide plate disposed on one side of the light source unit and configured to emit light incident from the light source unit,
    a plurality of uneven patterns forming crests and valleys being formed in at least one plane of the light guide plate, and the plurality of uneven patterns being formed such that the crests rise to a plurality of different heights.

19. The display device of claim 18, wherein the height of the crests follows a repeating pattern.

20. The display device of claim 18, wherein the plurality of uneven patterns form angles with respect to a horizontal plane that are varied from pattern to pattern.

* * * * *